United States Patent Office 3,442,026
Patented May 6, 1969

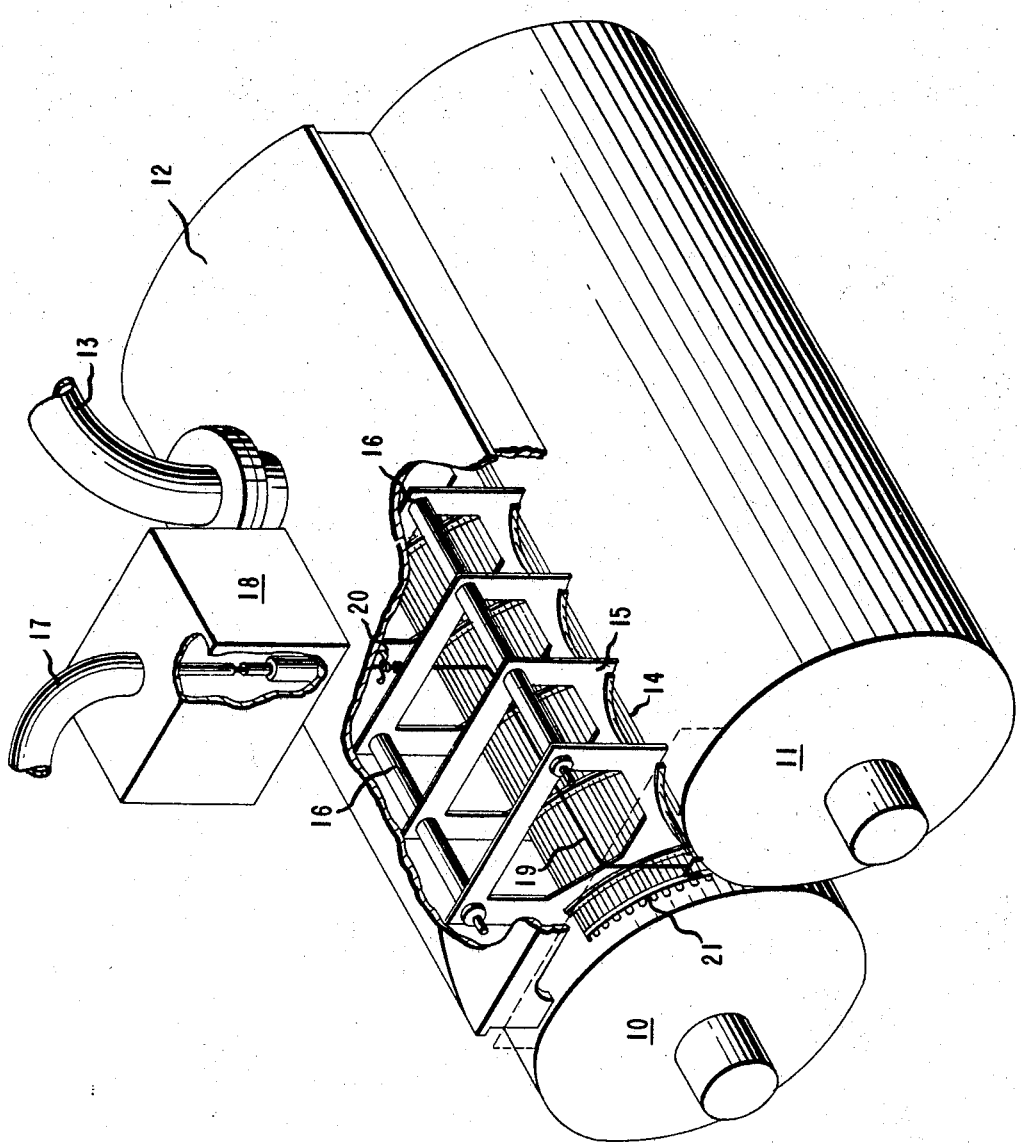
INVENTORS
ROBERT A. BERNARD
WILLIAM T. DOVE
JULIAN C. SMITH
BY Francis A. Paintin
ATTORNEY

3,442,026
DRUM DRYING OF POLYMERIC MATERIAL
Robert A. Bernard, Media, Pa., William T. Dove, Beaumont, Tex., and Julian C. Smith, Ithaca, N.Y., assignors to E. I. du Pont de Nemours and Company, Wilmington, Del., a corporation of Delaware
Filed Aug. 11, 1966, Ser. No. 571,881
Int. Cl. F26b 5/00; B01k 1/00
U.S. Cl. 34—1     6 Claims

ABSTRACT OF THE DISCLOSURE

Apparatus and process for drum drying a dielectric solvent solution of a polymer by forming a pool of the solution in the nip of two revolving drums, and with a conductive grid in the nip pool creating a potential difference of at least 10,000 volts per inch between each drum and the grid.

---

This invention relates to drum drying, and more particularly it relates to an improvement in drum drying of polymeric materials.

The isolation and recovery of polymeric materials from their solutions or aqueous dispersions by the use of drum dryers is well known. Conventionally, a pair of heated drum rolls situated closely adjacent one another are fed with a solution or dispersion of the polymeric material. The latter is fed into a nip pool formed above the nip of the rolls. A film of polymeric material is deposited upon the drum surface as it contacts the nip pool and is usually removed from the rolls by means of a doctor knife. In commercial operations the rate at which polymer can be recovered by this means is extremely important. Further, it is desirable to supply only enough heat to effect rapid recovery, but temperatures frequently have to be maintained at levels low enough to avoid a degradation of the polymer.

It is known that in such drum-drying operations the major amount of liquid or solvent is removed by boiling of the nip pool liquid. In the usual range of operation, it is known that the film boiling region exists on most of the drum surface. In this region a thin film of vaporized liquid forms over the drum surface within the nip pool, cutting down heat transfer so much that higher drum temperatures can actually create lower drying rates. The limitation of boilup rate due to the existence of film boiling also limits the film laydown rate on the drum surface which determines the rate of polymer recovery.

It is unexpectedly found that the drum drying of a polymer in a solution of a dielectric solvent wherein the polymer solution is fed to a nip pool can be improved by creating a potential difference of at least about 10,000 volts/inch between the drum surface and a conductive grid located within the nip pool; if the polymeric material is substantially nonpolar, i.e., does not contain a substantial number of polar groups like —Cl or —SO$_2$Cl on the polymer chain, it may be necessary to add a partly hydrophilic additive (i.e., having both oleophilic and hydrophilic groups present on the molecule) to decrease the ratio of bulk solution resistivity to the resistance of surface contact between the bulk solution and the drum. If more than about 2000 p.p.m. of water are present or if the potential difference is too high (e.g., above 80,000 volts/inch) arcing out may occur.

The term dielectric solvent means a solvent wherein the electrical resistivity is greater than about $1.9 \times 10^6$ ohm-centimeters.

The bulk solution resistivity is essentially the reciprocal of the conductivity of the bulk solution. The resistance of the surface contact between the bulk solution and the drum is best visualized as that portion of the resistance between the bulk solution and the drum which is not due to the bulk solution resistivity of itself; it can be calculated by subtracting from the total resistance, the resistance due to the bulk solution alone.

The partially hydrophilic additive when added to decrease the ratio of bulk solution resistivity to surface contact resistance actually acts to increase the conductivity of the bulk solution. A wide variety of additives are operable; it seems necessary, however, that they have ionic bonds in their molecular structure. Generally, about 0.1 to 2 parts/100 parts of polymeric material should be added when employed.

The invention will now be described in conjunction with the accompanying drawing illustrating a perspective view of a specific apparatus.

A pair of conventional drum drying rolls 10 and 11 are provided which can be mounted for rotation and heating by suitable means (not shown) well known to those skilled in the art. The nip pool between the two drums is covered by a housing 12 which has a vapor outlet 13; the latter can be connected to suitable exhaust or vacuum means (not shown) to assist in vapor removal. A plurality of tubes or bars 14, forming the grids, are suspended, as illustrated, in plastic hangers 15 such that they are spaced from each other and from the surface of the drums 10 and 11. The plastic hangers are suitably suspended and spaced from each other along supports 16 which are conventionally attached to the housing 12 by means not shown.

A cable 17 is connected from a source of high voltage direct current (not shown) to an oil-immerse terminal box 18. Conductive aluminum tubing 19 having anticorona toroid 20 thereon is connected from the box 18 to a pair of bus bars 21 which are connected across the ends of each bank of tubes 14 which form the grids. Drums 10 and 11 are grounded or connected to a source of opposite electrical potential by any conventional means (not shown). Preferably the drums act as the cathode and the grids as the anode; however, the polarity of each can be reversed. In actual operation the drums are equipped with doctor knife and polymer recovery means, neither of which are shown since they are conventionally known in the art and do not directly relate to the improvement described and claimed.

Typical of polymeric materials which are polar in character are elastomeric chlorosulfonated polyethylenes having sulfur contents ranging from about 0.1 to 4 weight percent sulfur and about 20 to 50 weight percent chlorine made from linear, high-density or branched-chain, low density polyethylenes. These are usually to be separated from their solutions in chlorinated solvents, e.g., carbon tetrachloride.

Typical of polymeric materials which are substantially nonpolar are elastomeric copolymers of ethylene and $\alpha$-olefins of about 3 to 8 carbon atoms, such as propylene, either alone or copolymerized with third monomers, such as non-conjugated hydrocarbon $C_6$–$C_{22}$ dienes, e.g., 1,4-hexadiene, 5 - methylene - 2 - norbornene, dicyclopentadiene and 1,5-cyclooctadiene. Such dipolymers and terpolymers are described in U.S. Patents 2,933,480, 3,000,-

866, 3,000,867, 3,063,973, 3,093,620, and 3,093,621. An important terpolymer is that of ethylene, propylene and 1,4-hexadiene having from about 33 to 44 weight percent propylene and about 3.5 to 4.5 weight percent 1,4-hexadiene and a Mooney viscosity (ML–4/250° F.) from about 40 to 70.

It is preferable that the viscosity of the polymer solution in the nip pool be no greater than about 200 poises because vapor disengagement from the drum surface interface becomes more difficult and the heat transfer coefficient drops. However, for economic reasons, it is desirable to have as high a solids concentration in the solution as operating convenience permits. Generally, any solution which is capable of being transferred throughout the preceding stages of the polymerization process will be suitable.

The hydrophilic additive employed should contain ionic bonds and can be selected from a wide variety of materials. One class includes sulfate and bisulfate salts of

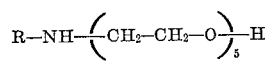

where R is $C_{18}$–$C_{22}$ tertiary alkyl, and

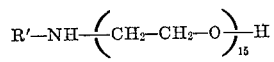

where R' is $C_{12}$–$C_{14}$ tertiary alkyl. Another class includes

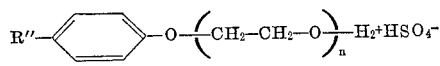

where R" is nonyl and $n$ is an integer (e.g., 10, 50, or 100). Another class includes the tetraalkyl quaternary ammonium chlorides: trimethyl lauryl ammonium chloride, trimethyl myristyl ammonium chloride, trimethyl stearyl ammonium chloride and dimethyl dilauryl ammonium chloride. A further class includes a blend of oil-soluble sulfonates, e.g., calcium sulfonate, with polyoxyethylene ethers.

The most preferred additive is the barium salt of nonylphenyl polyethyleneoxy phosphoric acid of a molecular weight of about 560. The presence of this salt in the isolated elastomeric polymer does not adversely affect the electrical properties thereof.

The type of additive suitable and its relation to current flow and drum-drying rate is not easily described. For example, 0.7 part/100 of distearyl dimethyl ammonium chloride permits a current flow of 170 microamps but a negligible increase in drying rate; other additives may show the same current flow but also show drying rate increases of 30 or 75%. The potassium salt of 2-ethylhexanoic acid shows a current flow of 430 microamps but 30% drying rate increase, whereas only 0.15 part/100 of ammonium sulfate shows a current of only 8 microamps but a drying rate inrrecase of 35%.

The invention will now be described with reference to the following examples of specific embodiments wherein parts and percentages are by weight unless otherwise specified.

POLYMERS ISOLATED

Polymer A is prepared in accordance with the general directions of U.S. Patent 2,933,480 by copolymerizing ethylene, propylene, and 1,4 hexadiene in tetrachloroethylene in the presence of a premixed coordination catalyst made by combining vanadium oxytrichloride and diisobutyl aluminum monochloride. The Mooney viscosity (ML–4) of this copolymer is about 70 (measured at 250° F.). The inherent viscosity (measured on a solution of 0.1 gram of copolymer in 100 ml. of tetrachloroethylene at 30° C.) is about 3.7 for a typical lot; the reduced viscosity of the same copolymer (measured on a 0.1% solution in decalin at 135° C.) is about 3.14. The copolymer contains about 44 weight percent propylene monomer units and 4 weight percent 1,4-hexadiene monomer units. This composition corresponds to about 63 mole percent ethylene, 35.3 mole percent propylene and 1.66 mole percent diene. The density of the copolymer is about 0.85–0.86 gram/cc.

Polymer B is made the same way as Polymer A except that the molecular weight is lowered by hydrogen modification. The copolymer has the same composition but exhibits a lower Mooney viscosity, the (ML–4/250° F.) value being about 40. The inherent viscosity (measured on a solution of 0.1 gram of copolymer in 100 ml. of tetrachloroethylene at 30° C.) for a typical lot is about 2.41; the reduced viscosity (measured on a 0.1% solution in decalin at 135° C.) is 2.03.

Polymer C is made according to the general directions of U.S. Patent 2,933,480 by copolymerizing ethylene, propylene, and 1,4-hexadiene in tetrachloroethylene in the presence of a coordination catalyst made by combining vanadium tetrachloride and diisobutyl aluminum monochloride in situ, hydrogen modification being used to lower the molecular weight. The Mooney viscosity (ML–4/250° F.) is about 45. The copolymer contains about 33% by weight propylene and 3.5 percent 1,4-hexadiene monomer units, the remainder being ethylene units.

Polymer D is a chlorosulfonated polyethylene made by chlorosulfonation, in accordance with U.S. Patents 2,586,363 and 2,862,917, of a linear polyethylene having a density of 0.96 g./cc. The chlorosulfonated polyethylene has a sulfur content of about 0.97% and a chlorine content of about 35.4% and a specific gravity of about 1.18.

Example 1

The drum dryer employed was a laboratory model having coacting chrominum plated drums each 6 inches in diameter and 8 inches long, steam heated at 150 p.s.i. (gauge) pressure, and turned at 10 r.p.m. An electrostatic grid was positioned ½-inch from the surface of each drum in the manner shown in the drawing. The grid served as the anode; the drums were the cathodes. The applied potential was 30 kv. A very slight vacuum was maintained on the housing.

A 5.0 percent by weight solution of Polymer A in tetrachloroethylene at 80° C. was deposited above the nip of the drum rolls. The film of copolymer deposited on the drums was subsequently stripped conventionally with a standard doctor blade.

Application of the electrostatic field itself did not cause an increase in the rate of copolymer isolation. When the following selected salts were present in the copolymer solution, a rate increase occurred.

(1) "Priminox T–5" $HSO_4$ salt: "Priminox T–5" has the following chemical formula $RNH(CH_2CH_2O)_5H$, where R is $C_{18}$–$C_{22}$ tertiary alkyl.

(2) "Priminox T–5" sulfate salt.

(3) "Priminox R–15" $HSO_4$ salt: "Priminox R–15" has the formula $RHN(CH_2CH_2O)_{15}H$, where R is $C_{12}$–$C_{14}$ tertiary alkyl.

(4) "Priminox R–15" sulfate salt.

(5) "Antara LF–205": Barium salt of a complex nonylphenyl polyethyleneoxy phosphoric acid ester having a molecular weight 560 and containing polyethyleneoxy units.

(6) "Antara LM–405": The same as additive #5 except that the molecular weight is about 1100, the increased weight being due to the increased length of the ethyleneoxy chains.

(7) "Antara LM–505": A barium salt of a complex organic phosphate ester having a molecular weight of about 1100 and containing polyethyleneoxy units.

In the following tabulations the additive concentration is given in parts/100 parts of polymer (phr.), the current is given in microamps and the percent increase is the percentage increase in rate of polymer isolated over that rate attainable when no additive is used.

| Additive | Additive concentration | Current | Percent increase |
|---|---|---|---|
| "Antara LF-205" | 0.65 | 110 | 6 |
|  | 1.30 | 165 | 95 |
| "Antara LM-405" | 1.24 | 230 | 80 |
|  | 2.48 | 400 | 110 |
| "Priminox T-5" HSO$_4$ salt | 0.0415 | 50 | 40 |
|  | 0.104 | 58 | 40 |
|  | 0.208 | 120 | 70 |
|  | 0.415 | 250 | 100 |
|  | 0.830 | 310 | 100 |
|  | 1.01 | 420 | 110 |
|  | 1.66 | 550 | 140 |
|  | 2.08 | 950 | 165 |
| "Priminox T-5" sulfate salt | 0.0765 | 22 | 10 |
|  | 0.191 | 110 | 50 |
|  | 0.382 | 250 | 100 |
|  | 0.765 | 300 | 100 |
| "Priminox R-15" HSO$_4$ salt | 0.055 | 35 | 10 |
|  | 0.137 | 43 | 30 |
|  | 0.274 | 75 | 45 |
|  | 0.300 | 110 | 50 |
|  | 0.600 | 170 | 75 |
|  | 0.870 | 200 | 80 |
|  | 1.10 | 185 | 100 |
|  | 1.20 | 300 | 105 |
| "Priminox R-15" sulfate | 0.49 | 55 | 40 |
|  | 0.97 | 80 | 50 |
|  | 1.50 | 400 | 110 |

The use of "Priminox T-5" chloride or H$_2$PO$_4$ salts gave much less effective results; the use of "Priminox T-5" itself showed no increase in drying rate.

The following tabulation indicates the use of bisulfate salts of ethyleneoxy compounds which are less active. Large rate increases can be obtained, but a large amount of additive must be introduced to gain this effect as compared with the modest proportions needed with the preferred additives.

All are nonyl phenoxy polyethyleneoxy ethanols.

"Igepal CO-710" contains about 10 ethyleneoxy units.

"Igepal CO-970" has about 50 ethyleneoxy units present.

"Igepal CO-990" contains about 100 ethyleneoxy units.

| Additive | Additive concentration | Current | Percent Increase |
|---|---|---|---|
| "Igepal CO-710" HSO$_4$ salt | 0.90 | 30 | 25 |
|  | 2.70 | 70 | 65 |
| "Igepal CO-970" HSO$_4$ salt | 2.84 | 120 | 75 |
|  | 5.68 | 130 | 85 |
| "Igepal CO-990" HSO$_4$ salt | 5.36 | 135 | 70 |
|  | 10.72 | 180 | 95 |

The effective additives used above contained sulfate or bisulfate anion. However, those anions alone are not enough to confer effectiveness. Note the following data obtained from experiments where the ethyleneoxy-containing cations of the sulfates and bisulfates have been replaced by other cations.

| Additive | Additive concentration | Current | Percent Increase |
|---|---|---|---|
| H$_2$SO$_4$ | 0.20 | 20 | 20 |
| Ammonium sulfate | 0.15 | 8 | 35 |
| n-Butylamine bisulfate | 0.27 | 12 | None |
| n-Hexadecylamine bisulfate | 0.39 | [1] 2,215 | 20 |
| Triethylamine bisulfate | 0.22 | 40 | 30 |
| 4,4'-diaminodiphenyl methane bisulfate | 0.448 | 0.11 | 20 |
| Dibenzylamine bisulfate | 0.336 | [2] 10 | 25 |
| Phenyl α-naphthylamine bisulfate | 0.36 | [3] 4 | 15 |
| Quinoline | 0.26 | 11 | 20 |
| Diisobutylamine bisulfate | 0.26 | 25 | 10 |
|  | 0.35 | 150 | 40 |
|  | 0.70 | 250 | 45 |
| Diethanolamine bisulfate | 0.23 | 11 | 10 |
| Triethanolamine bisulfate | 1.4 | 25 | 45 |
| Triethanolamine sulfate | 1.05 | 70 | 40 |
| Ethylenediamine bisulfate | 0.3 | 30 | 30 |
| "Quadrol" bisulfate | 0.55 | 14 | 15 |

[1] Kilovolt.
[2] 13 kilovolt.
[3] 20 kilovolt.

A limited class of quaternary ammonium chlorides has been effective. The following data show the results:

| Ammonium chloride additive | Additive concentration | Current | Percent increase |
|---|---|---|---|
| Trimethyl lauryl [1] | 0.34 | 170 | 75 |
| Trimethyl myristyl [2] | 0.315 | 225 | 90 |
| Trimethyl stearyl [3] | 0.37 | 210 | 75 |
| Dimethyl dilauryl | 0.54 | 180 | 50 |
| Dimethyl dipalmityl [4] | 0.57 | 220 | 15 |

[1] Dodecyl (C$_{12}$).
[2] Tetradecyl (C$_{14}$).
[3] Octadecyl (C$_{18}$).
[4] Hexadecyl (C$_{16}$).

Example 2.—Large-scale operation of the invention

A. ISOLATION OF POLYMER B

The double roll drum dryer being operated was arranged as depicted in the drawing. Each drum was 5 ft. in diameter and 12 ft. long. The drums, held together at each end with 13,300 lbs. force, turned at 10 r.p.m. and were heated by steam at 165 lbs./sq. in. gauge. The top of the nip was 5 ft. wide and the nip contained Polymer B solution (5.7% solids content in tetrachloroethylene) with only soluble water at 121° C. About 3,500 parts/million "Antara LF-205" was added (based on dry polymer) and a charge of 100,000 volts DC, positive, was applied to a network of 26 metal tubes (13 for each drum) each 128" long and ¼" in diameter and spaced on 1" centers, held parallel to the drum axis, and positioned 2" above the drum surface; all tubes were connected electrically. The current obtained was about 6.5 milliamperes and the drum dryer production rate was approximately 700 lbs./hr.

"Antara LF-205" consists of 50% barium salt of nonyl phenyl polyethyleneoxy phosphoric acid and 50% paraffinic petroleum oil.

B. ISOLATION OF POLYMER A

The double roll drum dryer and the network of metal tubes described above were employed; the drums were held together with the same force on each end and heated with the same pressure of steam as before, but turned at 12 r.p.m./min. The top of nip was up to 5 feet wide and the nip contained a Polymer A solution (4.8% solids content in tetrachloroethylene) with only soluble water at 121° C. About 4,000 parts/million of "Antara LF-205" (based on dry polymer) were added and a charge of 68,000 volts DC, positive, was applied to the network of metal tubes. The current obtained was about 7.3 milliamperes and drum dryer production rate was approximately 620 lbs./hr.

Example 3

The double roll drum dryer being operated had rolls 6" in diameter and 8" long, the top of the nip being 2 to 6" above the drum roll surface. The rolls were turned at 10 r.p.m./min. and heated by steam at 150 lbs./sq. in. gauge pressure. A network of 6 metal tubes (3 tubes for each drum) 3/16" in diameter and 6.5" long was positioned ½" above the surface of the drums in the solution while being spaced on ¾" centers and held parallel to the drum axis.

The nip contained polymer A solution (5% solids content in tetrachloroethylene) with only soluble water at 118° C. When the drum bite had been set at 2 to 8 mils, about 0.5 cc. of "Priminox T-5" and 2 drops of sulfuric acid were added and mixed with the solution. Each of the metal tubes was connected electrically and a charge of 20,000 volts, positive, was applied. The resulting current was about 250 microamperes and the drum dryer production rate was about 1.24 lbs./hr./ft. squared.

"Priminox T-5" is a 100% concentration condensate with 5 moles ethylene oxide bound to an alkyl chain where R is a mixture of isomers having 18 to 22 carbon atoms, with tertiary alkyl structure and having a formula of RNH(CH$_2$CH$_2$O)$_5$H.

Example 4

Chlorosulfonated polyethylene (Polymer D) was being isolated by drum drying at atmospheric pressure from a solution in carbon tetrachloride at 25° C. containing 14.06% solids. The coacting rolls of the double drum dryer were 6 inches long and 12.5 inches in diameter, about 0.0063 inch apart, rotated at 15.3 r.p.m., and heated by steam at about 138 p.s.i. (gauge). An electrostatic grid assembly was positioned ½ inch above a 64.5° sector of the surface of one drum near the nip, secured at the sides by a ⅛-inch thick polytetrafluoroethylene support. The grid served as the anode, the drum as the cathode. The grip was composed of 15 0.188-inch diameter rods whose centers were spaced at 0.50-inch intervals.

When the grid was activated to establish a gradient of 60 kv./inch, the rate of CSPE isolated was increased about 80% over the base rate of 2 lbs./hr./ft.$^2$. The addition of about 0.211 part/100 parts copolymer of "Antara LF-205" caused the rate to rise about 100% over the base value.

As many widely different embodiments of this invention may be made without departing from the spirit and scope thereof, it is to be understood that this invention is not limited to the specific embodiments thereof, and all changes which come within the meaning and range of equivalence are intended to be embraced therein.

What is claimed is:

1. In a process for drum drying a polymeric material in a solution of a dielectric solvent wherein the polymer solution is fed to a nip pool formed over the surface of a heated drum; the improvement of creating a potential difference of at least about 10,000 volts/inch between the drum surface and a conductive grid located within said nip pool, with the proviso that if said polymeric material is substantially nonpolar, a partly hydrophilic additive is added to decrease the ratio of bulk solution resistivity to the resistance of surface contact between the bulk solution and the drum.

2. A process as defined in claim 1 wherein said polymeric material is a substantially nonpolar copolymer of ethylene, propylene, nonconjugated hydrocarbon diene and said solvent is tetrachloroethylene.

3. A process as defined in claim 1 wherein said polymeric material is chlorosulfonated polyethylene and said solvent is carbon tetrachloride.

4. A process as defined in claim 2 wherein about 0.1 to 2 parts/100 parts of polymer, of an additive is selected from the group consisting of: (1) bisulfate and sulfate salts of

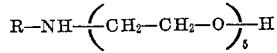

wherein R is $C_{18}$–$C_{22}$ tertiary alkyl, or

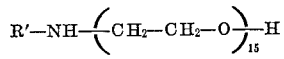

wherein R' is $C_{12}$–$C_{14}$ tertiary alkyl, (2) bisulfate salts of nonylphenyl polyethyleneoxide ethanols of 10, 50, or 100 ethyleneoxy units, (3) barium salts of nonylphenyl polyethyleneoxy phosphoric acid esters of molecular weights of about 560 or 1100, (4) blends of calcium sulfonates with polyoxyethylene ethers, and (5) quaternary tetraalkyl ammonium chlorides wherein the alkyl groups are trimethyl lauryl, trimethyl myristyl, trimethyl stearyl, or dimethyl lauryl.

5. A process as defined in claim 4 wherein said additive is the barium salt of nonylphenyl polyethyleneoxy phosphoric acid ester of molecular weight of about 560.

6. An apparatus for drum drying solutions of polymeric materials comprising:
 (a) a pair of drums in nip forming relationship to receive liquid polymer in the nip,
 (b) means for internally heating said drums,
 (c) an electrically conductive grid located within the space formed by the nip and the upper portion of the drums,
 (d) means for creating a constant electrical potential difference of at least 10,000 volts/inch between the drums and the conductive grid, and
 (e) means for rotating said drums.

References Cited

UNITED STATES PATENTS 2,434,966  1/1948  Sherman _____ 34—1 XR

JOHN J. CAMBY, *Primary Examiner.*